United States Patent
Ratha et al.

(10) Patent No.: US 11,902,424 B2
(45) Date of Patent: Feb. 13, 2024

(54) SECURE RE-ENCRYPTION OF HOMOMORPHICALLY ENCRYPTED DATA

(71) Applicant: International Business Machines Corporation, Armonk, NY (US)

(72) Inventors: Nalini K. Ratha, Yorktown Heights, NY (US); Karthik Nandakumar, Singapore (SG); Sharathchandra Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/953,409

(22) Filed: Nov. 20, 2020

(65) Prior Publication Data

US 2022/0166607 A1   May 26, 2022

(51) Int. Cl.
*H04L 9/08* (2006.01)
*H04L 9/00* (2022.01)
*G06N 20/00* (2019.01)

(52) U.S. Cl.
CPC ........... *H04L 9/0822* (2013.01); *G06N 20/00* (2019.01); *H04L 9/008* (2013.01); *H04L 9/0825* (2013.01); *H04L 9/0877* (2013.01); *H04L 2209/16* (2013.01)

(58) Field of Classification Search
CPC ..... H04L 9/0822; H04L 9/008; H04L 9/0877; H04L 2209/16; H04L 9/0825; G06N 20/00
See application file for complete search history.

(56) References Cited

U.S. PATENT DOCUMENTS

| 8,630,422 | B2 | 1/2014 | Gentry | |
|---|---|---|---|---|
| 10,289,816 | B1 * | 5/2019 | Malassenet | G06F 21/14 |
| 11,196,541 | B2 * | 12/2021 | Williams | G06N 3/08 |

(Continued)

FOREIGN PATENT DOCUMENTS

| CN | 109886417 A * | 6/2019 | ......... G06F 21/6254 |
|---|---|---|---|
| CN | 109886417 A | 6/2019 | |

(Continued)

OTHER PUBLICATIONS

International Patent Application No. PCT/CN2021/129013 filed Nov. 5, 2021.

(Continued)

*Primary Examiner* — Shin-Hon (Eric) Chen
*Assistant Examiner* — Thomas A Carnes
(74) *Attorney, Agent, or Firm* — David K. Mattheis

(57) ABSTRACT

Securely re-encrypting homomorphically encrypted data by receiving fully homomorphically encrypted (FHE) information from a client device, training a machine learning model using the FHE information, yielding FHE ciphertexts, applying a first transform to the FHE ciphertexts, yielding obfuscated FHE ciphertexts, sending the obfuscated FHE ciphertexts to a secure device, receiving a re-encrypted version of the obfuscated FHE ciphertexts from the secure device, applying a second transform to the re-encrypted version of the obfuscated FHE ciphertexts yielding de-obfuscated re-encrypted FHE ciphertexts, determining FHE ML model parameters according to the de-obfuscated re-encrypted ciphertexts, and sending the FHE ML model parameters to the client device.

20 Claims, 6 Drawing Sheets

(56) References Cited

U.S. PATENT DOCUMENTS

| | | | | |
|---|---|---|---|---|
| 2006/0140401 | A1* | 6/2006 | Johnson | G06F 21/14 380/44 |
| 2007/0192864 | A1* | 8/2007 | Bryant | G06F 21/54 726/23 |
| 2015/0381349 | A1* | 12/2015 | Nikolaenko | G06F 21/602 713/189 |
| 2016/0004874 | A1* | 1/2016 | Ioannidis | H04L 9/302 713/165 |
| 2016/0020904 | A1* | 1/2016 | Ioannidis | G06F 17/16 713/174 |
| 2016/0241387 | A1* | 8/2016 | Fascenda | H04L 9/002 |
| 2017/0244553 | A1* | 8/2017 | Savry | G06F 21/72 |
| 2018/0048459 | A1* | 2/2018 | Ding | G06F 21/575 |
| 2018/0359084 | A1* | 12/2018 | Jain | H04L 9/08 |
| 2018/0359229 | A1* | 12/2018 | Ding | H04L 63/0464 |
| 2018/0359259 | A1* | 12/2018 | Leon | G06F 9/445 |
| 2019/0036678 | A1* | 1/2019 | Ahmed | H04L 9/302 |
| 2019/0182027 | A1* | 6/2019 | Kipnis | H04L 9/3093 |
| 2019/0327077 | A1* | 10/2019 | Mandal | H04L 9/0861 |
| 2020/0019867 | A1* | 1/2020 | Nandakumar | G06F 21/602 |
| 2020/0065524 | A1* | 2/2020 | Carlson | G06F 16/2365 |
| 2020/0104636 | A1* | 4/2020 | Halevi | G06V 10/454 |
| 2020/0136797 | A1* | 4/2020 | Yu | H04L 9/008 |
| 2020/0204341 | A1* | 6/2020 | Williams | G06N 5/003 |
| 2020/2043411 | | 6/2020 | Anne | |
| 2020/0252198 | A1* | 8/2020 | Nandakumar | H04L 9/008 |
| 2020/0265159 | A1* | 8/2020 | Schmatz | G06F 21/6245 |
| 2020/0366459 | A1* | 11/2020 | Nandakumar | G06F 21/6245 |
| 2021/3123341 | | 10/2021 | Yang | |

FOREIGN PATENT DOCUMENTS

| | | | | |
|---|---|---|---|---|
| CN | 110891066 | A | * 3/2020 | ......... H04L 63/0421 |
| CN | 110891066 | A | 3/2020 | |
| EP | 3493460 | A | 6/2019 | |
| JP | 2019168590 | A | * 10/2019 | |

OTHER PUBLICATIONS

International Search Report and Written Opinion dated Feb. 7, 2022 from International Application No. PCT/CN2021/129013 filed Nov. 5, 2021.

Patents Act 1977: Examination Report under Section 18(3), dated Jul. 13, 2023, Application No. GB2308776.0, 4 Pgs.

"Understanding the methodology behind side-channel attacks—Rambus", Rambus Press, Mar. 30, 2015, 1 page.

Deng et al., "Privacy-preserving quantum multi-party computation based on circular structure", Journal of Information Security and Applications 47 (2019) 120-124, Available online May 9, 2019, 5 pages, https://doi.org/10.1016/j.iisa.2019.04.011.

Goldreich et al., "How to Play Any Mental Game", pp. 218-229, Copyright 1987 ACM 0-89791-221-7/87/0006-0218.

Juvekar et al., "Gazelle: A Low Latency Framework for Secure Neural Network Inference", This paper is included in the Proceedings of the 27th USENIX Security Symposium, Aug. 15-17, 2018, Baltimore, MD, USA, 19 pages.

Juvekar et al., "GAZELLE: A Low Latency Framework for Secure Neural Network Inference", arXiv: 1801.05507v1 [cs.CR] Jan. 16, 2018, 17 pages.

Liu et al., "Privacy preserving distributed data mining based on secure multi-party computation", Computer Communications 153 (2020) 208-216, Available online Feb. 8, 2020, 9 pages, https://doi.org/10.1016/j.comcom.2020.02.014.

Mell et al., "The NIST Definition of Cloud Computing", Recommendations of the National Institute of Standards and Technology, Special Publication 800-145, Sep. 2011, 7 pages.

Roy et al., "Hardware Assisted Fully Homomorphic Function Evaluation and Encrypted Search", IEEE Transactions on Computers, vol. 66, No. 9, Sep. 2017, pp. 1562-1572.

Varnovskiy et al., "Secure Cloud Computing Based on Threshold Homomorphic Encryption," Programming and Computer Software, 2015, vol. 41, No. 4, pp. 215-218.

Vepakomma et al., "Split learning for health: Distributed deep learning without sharing raw patient data", arXiv:1812.00564v1 [cs.LG] Dec. 3, 2018, 32nd Conference on Neural Information Processing Systems (NIPS 2018), Montreal, Canada, 7 pages.

Yao, Andrew Chi-Chih, "How to Generate and Exchange Secrets", extended abstract, 27th Annual Symposium on Foundations of Computer Science (SFCS 1986) 6 pages.

* cited by examiner

410

420

SECURE RE-ENCRYPTION OF HOMOMORPHICALLY ENCRYPTED DATA

BACKGROUND

The disclosure relates generally to securing data that is protected using fully homomorphic encryption (FHE). The disclosure relates particularly to obfuscating the FHE (fully homomorphic encryption) data passed between a service provider and a hardware security module (HSM) provider.

Machine learning as a service (MLaaS) enables a client to provide a training data set to a cloud, or other network-based service provider, for the training of a model. The service provider receives the training data set, utilizes the training data to develop the model, and passes the model parameters for the trained model to the client.

Using FHE to encrypt the training data and decrypt the model parameters, enables the training process to proceed without the service provider accessing the training data set or learning any details regarding the training data or associated model parameters. Fully homomorphic encryption provides encrypted data which may be used to train the model and determine the parameters for the model without decrypting the data. Training the model with encrypted data yields encrypted model parameters which are passed to the user and decrypted using the FHE. FHE affords a user access to the parameters of a trained model from a service provider without exposing the training data or final model parameters to the service provider.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the secure re-encryption of homomorphically encrypted data.

Aspects of the invention disclose methods, systems and computer readable media associated with secure re-encrypting homomorphically encrypted data by receiving fully homomorphically encrypted (FHE) information from a client device, training a machine learning model using the FHE information, yielding FHE ciphertexts, applying a first transform to the FHE ciphertexts, yielding obfuscated FHE ciphertexts, sending the obfuscated FHE ciphertexts to a secure device, receiving a re-encrypted version of the obfuscated FHE ciphertexts from the secure device, applying a second transform to the re-encrypted version of the obfuscated FHE ciphertexts yielding de-obfuscated re-encrypted FHE ciphertexts, determining FHE ML model parameters according to the de-obfuscated re-encrypted ciphertexts, and sending the FHE ML model parameters to the client device.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
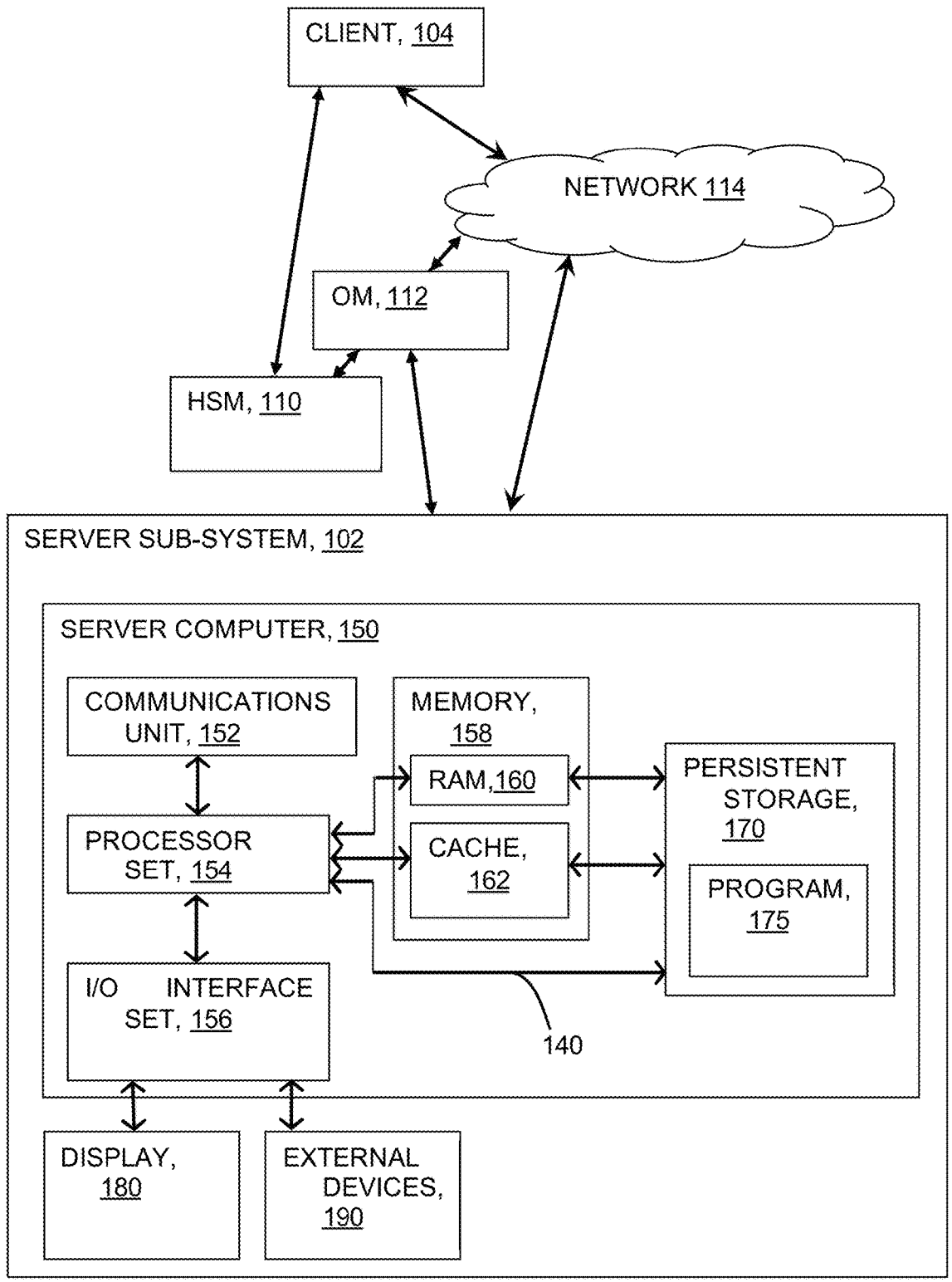
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., receiving information from a client device, applying a first transform to the information, wherein the first transform yields obfuscated information, sending the obfuscated information to a secure device, receiving transformed obfuscated information from the secure device, applying a second transform to the transformed obfuscated information to yield de-obfuscated transformed information, sending the de-obfuscated transformed information to the client device, etc.). These solutions are not abstract and cannot be performed as a set of mental acts by a human due to the processing capabilities needed to facilitate FHE encryption of data and model parameters, securely sending FHE data over a network, receiving FHE data and decrypting the FHE data for example. Further, some of the processes performed may be performed by a specialized computer for carrying out defined tasks related to using FHE. For example, a specialized computer can be employed to carry out tasks related to securely sending FHE data over a network, or the like.

Any mathematical operation on FHE data introduces noise in the data. The noise accumulates with the depth of the operations (number of sequential operations) and may introduce decryption errors at high levels. Efforts to reduce noise in the FHE data have included bootstrapping, where an encrypted private key is used to reduce data noise. Bootstrapping can be computationally expensive to conduct on a large-scale basis. The alternative is to enable the service provider to send the FHE data to a hardware assistance module, which has the private key to securely decrypt the FHE data and re-encrypt it before sending it back. The latter approach has two main limitations. Firstly, an adversary who is monitoring the communication link between the service provider and hardware security may discern the type of computations being performed by the service provider. Secondly, the hardware assistance module may decipher the computations being performed by the service provider. This disclosure provides ways to obfuscate the data exchanged between the service provider and hardware assistance module to overcome the above two limitations.

A client desiring a trained machine learning model may turn to a service provider to build the model. The service provider may provide the model architecture and the computing resources needed to train the model. The client provides the training data set. The client may wish to shield the data of the training set from the service provider while still utilizing the provider to build and train the model. Homomorphic encryption (HE) enables the use of encrypted data to evaluate logic circuits, or in this example, to train the machine learning model. Because the HE data is encrypted prior to arriving at the service provider, the service provider has no access to the underlying data values. Training may occur using the HE data without access to the associated decryption key or the ability to decrypt the data. The use of HE for training may be limited, as each step in the training process introduces noise in the encrypted data. This noise may limit the extent of machine learning possible using HE. As the model training progresses using the HE data, the noise in the data grows. The extent of the noise may render the encrypted data unusable after exceeding the system's capacity to decrypt the noisy signals. One solution includes using an encryption of the private key to periodically re-crypt the HE ciphertexts. This process is called "bootstrapping" and it reduces the noise in the ciphertexts. This re-encryption/bootstrapping process may not be available for all systems and may be computationally expensive to implement. Disclosed embodiments enable the exchange of FHE data across a network with an HSM service provider to reduce the noise by decrypting and re-encrypting the data, while maintaining the privacy and security of the data from entities such as the HSM service provider or a malicious entity having access to the network communications traffic.

In an embodiment, FHE data passes from a client to a cloud or other network service provider. The service provider utilizes the FHE data to evaluate a logic circuit or in the training of a machine learning model, such as a neural network model. The FHE data is encrypted by the client using a private key or a public key of a public-private key pair. The client does not pass the private key to the service provider. Training the model or evaluating the circuit yields intermediate results from the FHE input data. The intermediate results include noise due to the underlying encryption of the data. In this embodiment, the method passes the intermediate results from the system of the service provider to an external entity, such as a hardware security module (HSM). In this embodiment, the method additively blinds the intermediate results to enhance the security of the encrypted data. The HSM alters the received ciphertexts. The HSM decrypts and then re-encrypts the ciphertexts containing the intermediate results received from the service provider's system. The client provides the private key to the HSM for decrypting and then re-encrypting the intermediate results from the service provider. The client may provide the private key to the HSM by way of a separate communications channel than the channel used for the FHE data.

The steps of decrypting and re-encrypting the intermediate results using the private key reduce or eliminate the noise in the intermediate results. Passing the re-encrypted intermediate results back to the service provider enable a continuation of model training or circuit evaluation using results having little if any noise. This enables the service provider to train model structures having more layers, as noise does not accumulate in the model during the training. The use of the FHE training data for training the model yields a set of encrypted model parameters. After training ends, the encrypted model parameters are passed to the client for decryption using the private key. The service provider "sees" only encrypted data and encrypted model parameters.

In this embodiment, the passage of intermediate results from the service provider to the HSM and back, occurs at regular intervals associated with model architectures. Ciphertexts, including intermediate results, may be passed to the HSM after the calculations for each layer of a network, or after the noise in the results exhausts the multiplicative depth of the system. The intervals and number of ciphertexts relate to the nature of the architectural structure of the model and may serve as a pathway to obtaining this information. For example, the number of model layers, number of nodes per layer, type of activation and training strategy may be discerned from analysis of the communications between the service provider's system and the HSM.

In an embodiment, the addition of an obfuscation module (OM) between the service provider's system and the HSM enhances the privacy protection for the model. In this embodiment, the OM obfuscates the ciphertexts passed between the system and HSM reducing the accuracy of any information available from any analysis of the system's HSM communications traffic.

By applying obfuscation to the information, disclosed embodiments enable communications between the CAM and the HAM to proceed without a concern that details of the processing of the CAM are discernible from the messaging traffic. Obfuscation hides details otherwise available in passing ciphertexts associated with reducing the noise in FHE data during the training of a machine learning model by the CAM.

In an embodiment, the OM supplements the ciphertexts containing the intermediate results with additional ciphertexts. The OM sends the additional ciphertexts to the HSM at random intervals, altering any regular pattern associated with the ciphertexts containing the actual intermediate results.

In an embodiment, the OM alters the timing of the ciphertexts, delaying the sending of some or all ciphertexts to alter the pattern of the original stream of ciphertexts received from the service provider's system. In an embodiment, the OM alters the frequency of the ciphertexts by shifting some or all ciphertexts along a timeline to remove all or some of the periodic aspects of the stream of ciphertexts.

In an embodiment, the ciphertexts comprise a number of slots, each slot containing values associated with the intermediate values. In this embodiment, the OM changes the order of the slots of a ciphertext before sending the text to the HSM. Upon receipt of the re-encrypted version of the ciphertext, the OM re-arranges the ciphertext slot values in the original order before sending the re-encrypted ciphertext back to the service provider's system.

In an embodiment, the OM randomly selects ciphertexts for re-encryption from the overall set of service provider system ciphertexts. In this embodiment, the OM may randomly select ciphertexts using any known randomization function including random selection based upon remaining ciphertext depth—how many more ciphertext operations can be performed before the noise in the encrypted data exceeds the decryption noise threshold. When the remaining ciphertext depth is high, the probability of selection would be typically lower. The probability of selection of a ciphertext would increase as the remaining ciphertext depth diminishes. As the noise accumulates, ciphertext depth diminishes to a point of ciphertext depth exhaustion where the noise prevents further productive evaluation or development of a machine learning model. As ciphertext depth diminishes the probability of random selection increases to diminish the rising noise level prior to the point of exhaustion. At low levels of noise, indicated by high levels of remaining ciphertext depth, there is less need to reduce noise and the probability of ciphertext selection is lower.

In an embodiment, the OM determines an optimal trade-off between ensuring model privacy and the computing resource cost and process delays associated with adding obfuscation. In this embodiment, the method determines the percentage of the original ciphertext stream which will be altered by obfuscation relative to the computational cost of added ciphertexts and evaluates the total time associated with ciphertext delays relative to the time associated with passing the information without obfuscation.

FIG. 1 provides a schematic illustration of exemplary network resources associated with practicing the disclosed inventions. The inventions may be practiced in the processors of any of the disclosed elements which process an instruction stream. As shown in the figure, a networked hardware security module (HSM) 110 connects to the server sub-system 102 and either wirelessly or via a wired connection with client device 104. HSM 110 connects through a wired or wireless connection with the server sub-system 102 of a service provider by way of OM 112 and network 114. The client device 104 may also connect through a wired or wireless connection with server sub-system 102 via network 114. Client device 104, HSM 110, and OM 112 comprise FHE security program (not shown) together with enough computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made. In an embodiment, (not shown), OM 112 resides within server sub-system 102. In this embodiment, all communications between server sub-system 102 and HSM 110 passes through OM 112.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the FHE security program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., FHE security program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

In an embodiment, client device 104 applies encryption to a training data set intended for use in training a machine learning model. The encryption includes the use of a private or public key to homomorphically encrypt the data set. The homomorphically encrypted data set passes from client device 104 to server subsystem 102 over network 114. Server sub-system 102 may be local and under the control of the same entity as client device 104, or server sub-system 102 may be a cloud resource offered for use by a cloud service provider for development and training of machine learning models. As the server sub-system uses the provided data for evaluation or training without decrypting the data, the overall process utilizes fully homomorphic encryption (FHE). The Server sub-system 102 receives the FHE data from client device 104 and utilizes the FHE data to evaluate a specified circuit or to train a specified machine learning model. During the evaluation or training, the server sub-system generates intermediate values or ciphertexts, associated with the evaluation or training. Due to the FHE nature of the data, these ciphertexts include noise. Absent any effort to reduce the noise, it will increase and introduce decryption errors in the final results.

In some systems, server subsystem 102 passes the encrypted intermediate results to HSM 110 as a stream of ciphertexts including one or more intermediate results per ciphertext. HSM 110 utilizes the private key received from client 104 to decrypt and then re-encrypt each ciphertext. This decryption—re-encryption process reduces or eliminates noise from the intermediate results carried in the ciphertexts. HSM 110 passes re-encrypted intermediate results back to server sub-system 102 as a stream of ciphertexts corresponding to the original stream.

In such systems, the nature of the architecture of the machine learning model, may be discerned using information leaked in the stream of ciphertexts. Information about the model such as the number of model layers, number of nodes per layer, CAM calculation details, type of activation and training strategy may be determined from analysis of the ciphertext stream.

In an embodiment shown in FIG. 1, the method adds obfuscation module (OM) 112 to the overall networked system. OM 112 resides between server-subsystem 102 and HSM 110 and all communications traffic between server sub-system 102 and HSM 110 passes through OM 112. In this embodiment, OM 112 alters the stream of ciphertexts sent from server sub-system 102 to HSM 110. The alterations obfuscate architectural details such as the number of model layers, number of nodes per layer, type of activation and training strategy, otherwise discernible from the messaging stream. OM 112 de-obfuscates message passing from HSM 110 to server sub-system 102 to provide reduced noise ciphertexts to the server sub-system. In an embodiment, OM 112 resides as an embedded portion of server sub-system 102 and communications between server-subsystem 102 and HSM 110 flows through from server sub-system 102 to OM 112, over network 114 to HSM 110, and back, along the same routing.

After receiving the de-obfuscated ciphertexts, the method proceeds with training the ML model. Multiple epochs or iterations of training may occur. Multiple sets of intermediate ciphertexts may be passed through OM 112 to HSM 110 and back to server sub-system 102. After completion of the training of ML model the method passes a set of FHE ML model parameters to client device 104. Client device 104 utilizes the client private key to de-encrypt the FHE ML model parameters enabling the client to utilize the trained ML model to analyze new data.

Figure 2:
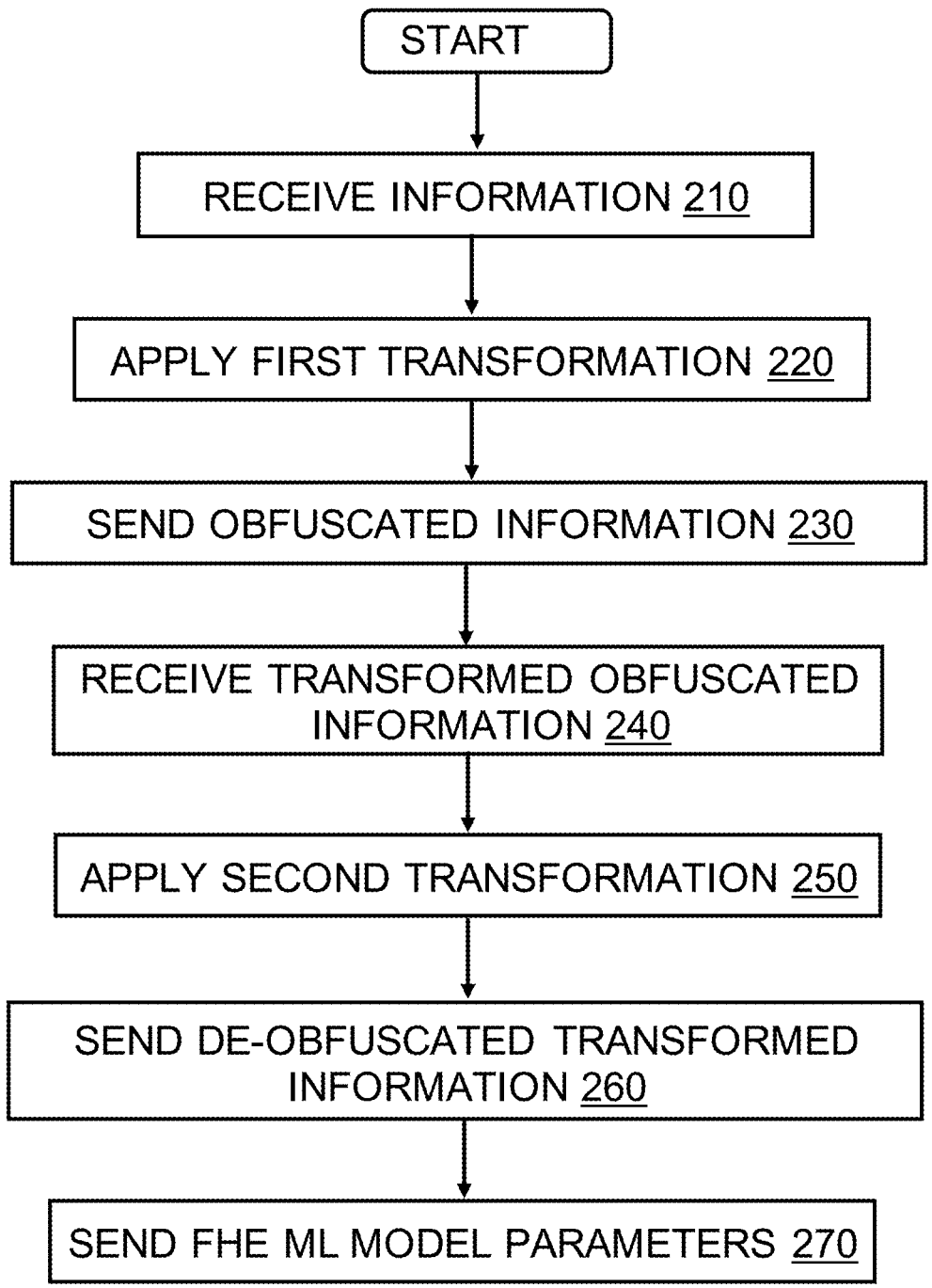
FIG. 2 provides a flowchart depicting an operational sequence, according to an embodiment of the invention.

FIG. 2 provides a flowchart 200, illustrating exemplary activities associated with the practice of the disclosure. After program start, at block 210, the method of FHE security program 175, acting through an obfuscation module (OM), receives information from a client device such as a computing agent module (CAM). In an embodiment, the information includes ciphertexts from the CAM including FHE data intermediate results and the CAM includes the system processors of a cloud-based service provider training a machine learning model for a remote client. The received information includes data encrypted using a private or public key of a client of the CAM.

At block 220, the method of FHE security program 175, acting through the OM, applies a first transform to the information received from the CAM. The applied transform may supplement the information by adding generated spurious information such as "fake" ciphertexts to the received information. The addition of fake ciphertexts alters the pattern of ciphertexts in the communication downstream from the OM. This alteration obfuscates any information discernible in the original stream of information received from the CAM, including the number of model layers, number of nodes per layer, type of activation and training strategy, and CAM calculation details. The applied transformation may include additively blinding the received information by adding data to each received ciphertext such that information passed downstream is no longer identical to the information received from the CAM.

In an embodiment, the applied transform introduces random delays in the timing or frequency of passing received ciphertexts or other information along to a downstream element. In this embodiment, the delays may include delaying the timing of all or part of the original stream of ciphertexts or altering the timing of all or part of the original ciphertexts while also adding fake ciphertexts to the stream of received information passed to the downstream element. In an embodiment, the method may alter the frequency of ciphertexts by shifting some or all received ciphertexts to disrupt any regular frequency pattern associated with the received ciphertexts.

In an embodiment, the applied transformation randomly selects received ciphertexts and sends only the selected ciphertexts for downstream processing such as decryption, re-encryption by an HSM. In this embodiment, the transformation may randomly select ciphertexts using a random number generator to determine the next ciphertext for downstream processing, e.g., from a first selected ciphertext, the transformation determines a random number indicating the number of ciphertexts to skip before the next ciphertext selected for downstream processing. Selecting only a portion of the overall set of ciphertexts for downstream processing increases FHE security by altering any original pattern of ciphertext messages but results in more noise in the overall stream of ciphertexts used by the CAM to evaluate a circuit or train a machine learning model. The overall stream contains more noise as only a portion of the stream is passed to the HSM for decryption, re-encryption. In this embodiment, the method may select ciphertexts according to the remaining ciphertext depth.

In an embodiment, the method balances the computational costs associated with various obfuscation techniques against the degree to which each technique, or combination of techniques, alters the original stream of information provided by the CAM.

At block 230, the method of FHE security program 175, sends transformed information from the OM to a downstream entity such as to a hardware assistance module (HAM), such as a Hardware Security Module (HSM). The information sent to the HAM/HSM has been altered by the OM and is no longer identical to the stream of information received by the OM from the CAM.

The HAM/HSM transforms the information received from the OM. In an embodiment, an HSM utilizes a cryptographic private key provided by directly to the HSM by the client or client device, to decrypt the information received from the OM and to then re-encrypt the information. The steps of decrypting and re-encrypting the information reduce, or eliminate, noise introduced by the original encryption applied by the client to the original data prior to sending data from the client to the CAM for processing. The alteration in the noise levels in the intermediate results enables the CAM to train a more extensive, deeper, machine learning model suing the FHE from the client. Though a deeper model may be trained due to the noise reduction, the CAM still lacks any capability to decrypt the client training data or see the client unencrypted data. Due to the obfuscation of the stream of information passed from the CAM to the HAM, the HAM lacks any capacity to derive meaningful information about the circuit being evaluated or model being trained from the provided stream of information. After decrypting and re-encrypting the information received from the OM, the HAM sends the re-encrypted information to the OM.

At block 240, the method of FHE security program 175, the OM receives transformed obfuscated information from the HAM/HSM. The original obfuscated information has been decrypted and re-encrypted by the HSM removing accumulated noise from the information.

At block 250, the OM applies the reverse of the original obfuscating transform to the received information. For example, the OM removes fake ciphertexts from the received information and removes any additive blinding from the received ciphertexts.

At block 260, the method of FHE security program 175 sends the de-obfuscated transformed information back to the CAM. As an example, the OM de-obfuscates a stream of re-encrypted ciphertexts received from an HSM, removing fake ciphertexts previously added as well as removing any additive blinding artifacts. The OM then sends the de-obfuscated stream of ciphertexts to the CAM for further use evaluating a circuit or training a machine learning model. In an embodiment, the method uses the received re-encrypted ciphertexts in determining the ML model parameters. The use of FHE data and encrypted ciphertexts yields FHE ML model parameters which cannot be read by the MLaaS provider.

At block 270, the method passes the FHE ML model parameters back to the client device. In this embodiment, the client device decrypts the received FHE ML model parameters. The client may then use the decrypted ML model parameters to analyze new data.

Figure 3:
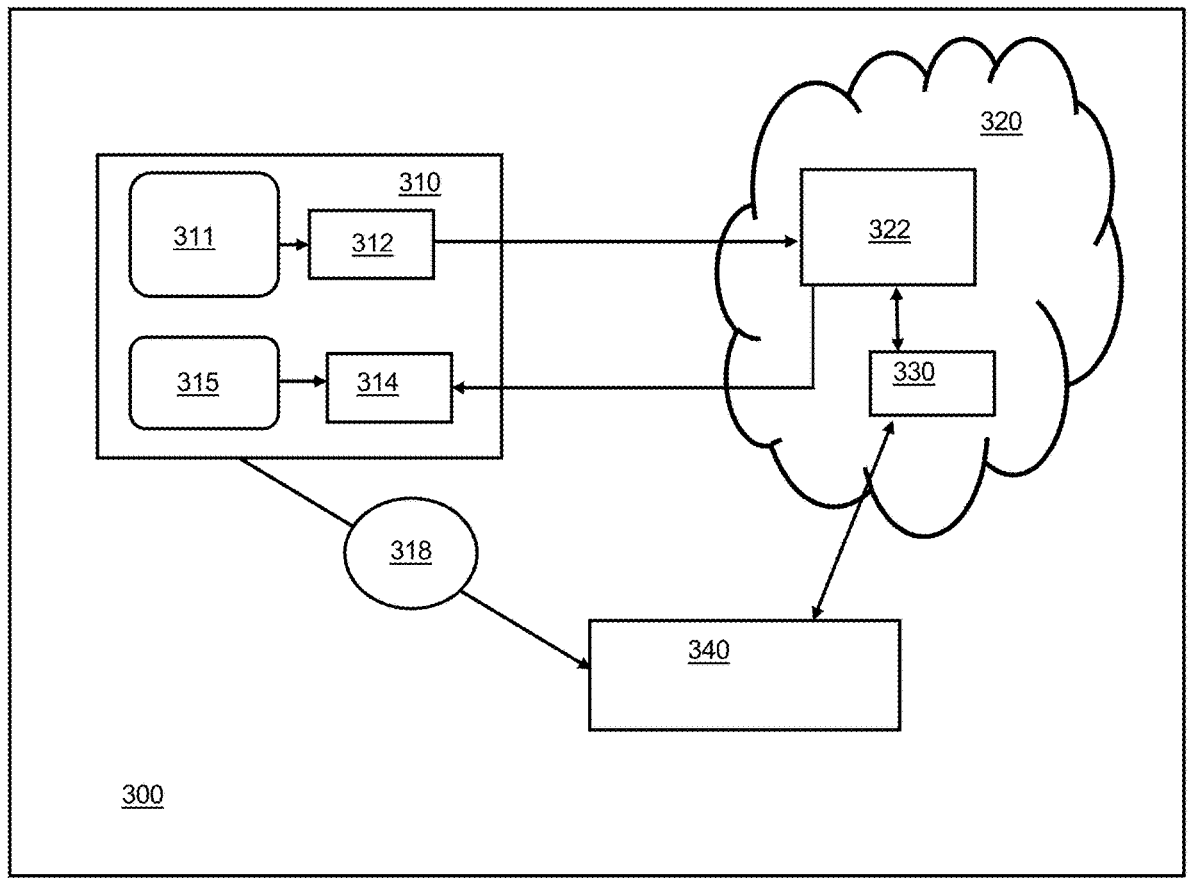
FIG. 3 provides a schematic view of a network architecture, according to an embodiment of the invention.

FIG. 3 provides a schematic view 300 of a networked computing environment according to an embodiment of the invention. Schematic 300 illustrates an environment for a scenario wherein a client possesses a training data set 311 and desires an ML model having ML model parameters 315 for analyzing data. As shown in the figure, training data 311 becomes fully homomorphically encrypted (FHE) training data at 312, and passes from a client device 310, to an MLaaS provider server 320. Client device 310 utilizes either a client private key or a client public key from a client private-public key pair, to encrypt the training data at 312, yielding the FHE training data. The MLaaS server 320 trains an ML model 322 using the FHE training data. ML model training progression results in the generation of intermediate results in the form of encrypted ciphertexts. These ciphertexts include noise due to the use of FHE training data. The method passes the encrypted ciphertexts through an obfuscation module (OM) 330 to alter the ciphertext stream, hiding information otherwise discernible about the ML model including the number of model layers, number of nodes per layer, type of activation and training strategy. OM 330 may add false ciphertexts, alter the frequency of the ciphertexts, randomly select only a portion of the overall stream of ciphertexts, or otherwise alter the pattern of ciphertext information.

As shown in FIG. 3, the method passes the obfuscated ciphertexts from OM 330 to an external HSM 340. Client device 310 provides HSM 340 with the client private key 318 of the client private-public key pair associated with encrypting the FHE training data 312. The HSM uses the received private key 318 to decrypt and then re-encrypt the received intermediate results ciphertexts. Decrypting and subsequently re-encrypting the ciphertexts reduces the noise in the ciphertexts enabling further training of the ML model by the MLaaS server 320.

The HSM 340 passes the re-encrypted ciphertexts back to the MLaaS provider server 320 through OM 330. OM 330 de-obfuscates the re-encrypted stream of ciphertexts removing the previously applied obfuscation from the stream.

MLaaS server 320 utilizes the re-encrypted ciphertexts to further train the ML model 322. MLaaS server 320 may pass multiple iterations of intermediate results ciphertexts through OM 330 to HSM 340, receiving corresponding re-encrypted ciphertexts in return. Iterations may continue until the ML model is fully trained by the MLaaS server 320. The fully trained ML model includes a set of FHE ML model parameters which define the ML model. The FHE ML model parameters are encrypted and cannot be read by the MLaaS provider. The MLaaS server 320 passes the FHE ML model parameters to client device 310. Client device 310 decrypts the FHE ML model parameters using the client private key at 314. Client device 310 then has possession of decrypted ML model parameters 315 and can construct and use the ML model to analyze new data.

Figure 4:
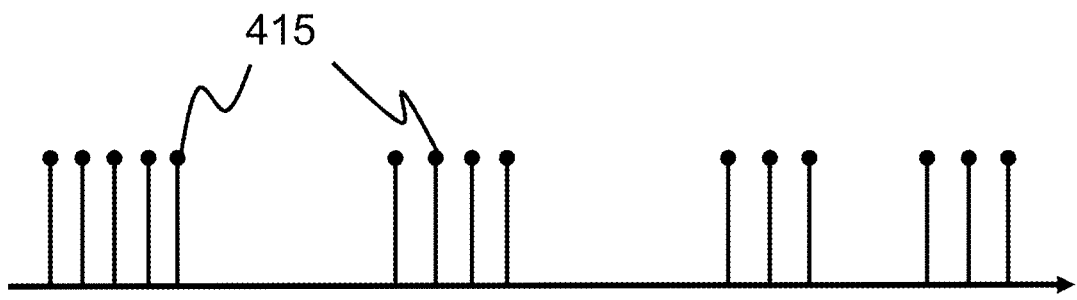
FIG. 4 provides timelines of communications, according to an embodiment of the invention
Figure 4:
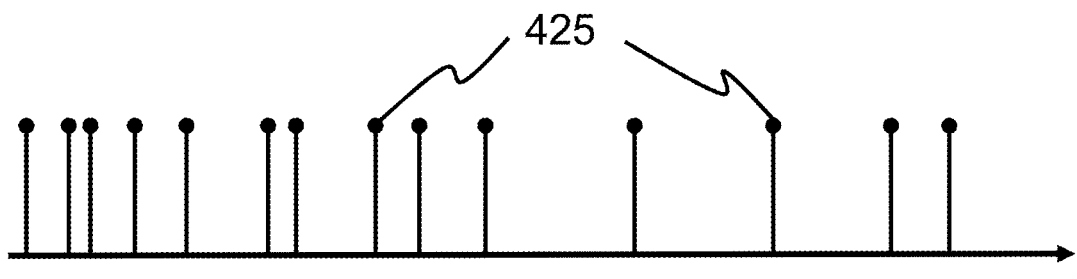

FIG. 4 illustrates communications messaging timelines between a CAM and an HSM, without obfuscation of the data at 410, and with obfuscation of the data as described above at 420. As shown in the figure, the regular patterns and spacing of the messages 415 disposed along timeline 410 and communicated without the disclosed obfuscation, have been eliminated by obfuscating the stream of information by adding the OM between the CAM and the HSM. The stream of obfuscated messages 425, disposed along timeline 420, no longer contain the revealing ML model architectural details.

Disclosed embodiments provide for the use of MLaaS remote resources available from edge cloud or cloud resource providers. These resources enable a MLaaS consumer to access ML architectures and associated computing environment resources on an as needed basis.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Machine learning as a service (MLaaS): the capability provided for consumers to utilize a provider's machine learning model architectures to train a ML model using the consumer's training data and to subsequently utilize the trained model. The consumer passes data to the provider and receives output from the trained model. The consumer does not manage the underlying cloud resources utilized for the model.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
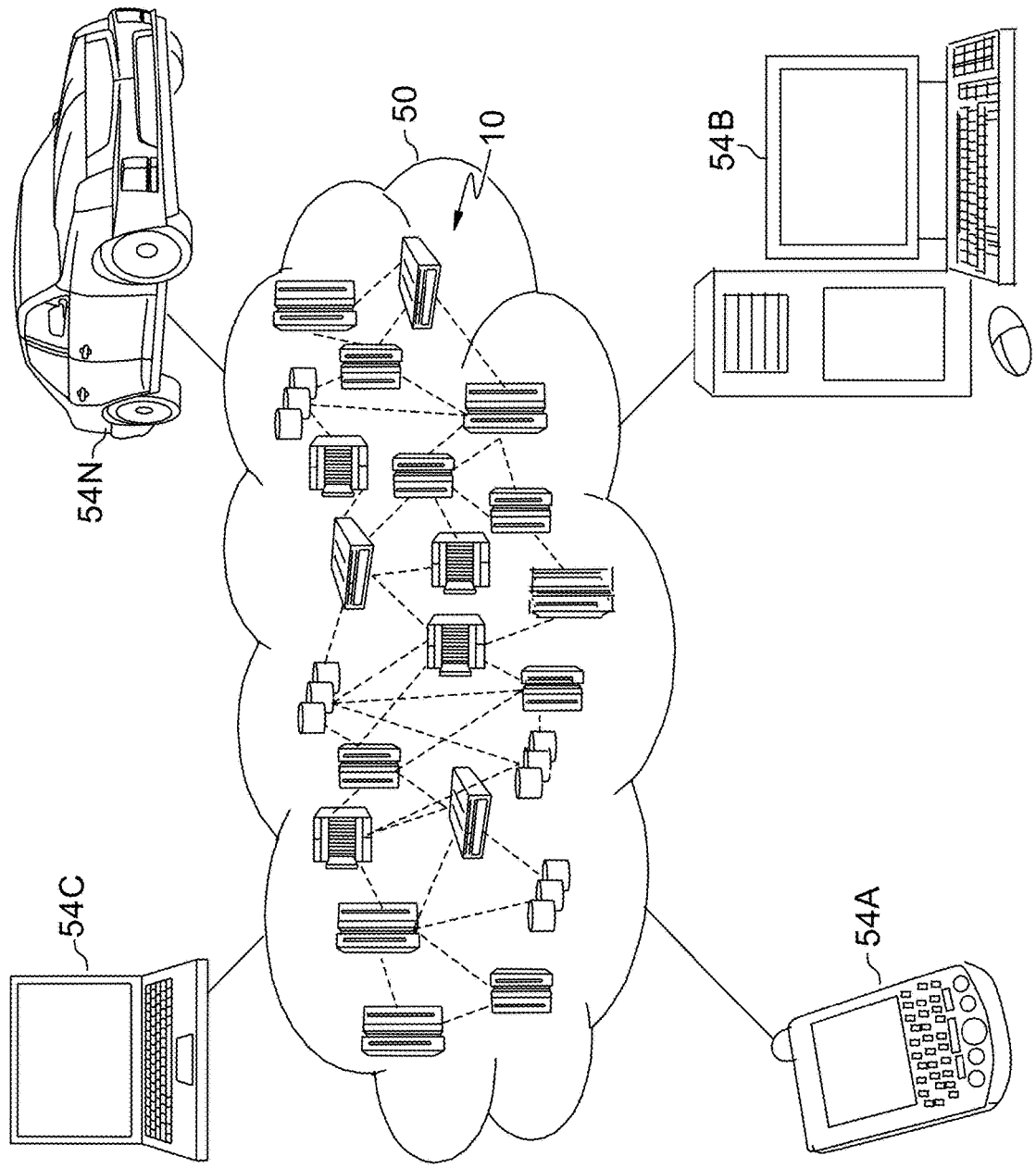
FIG. 5 depicts a cloud computing environment, according to an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
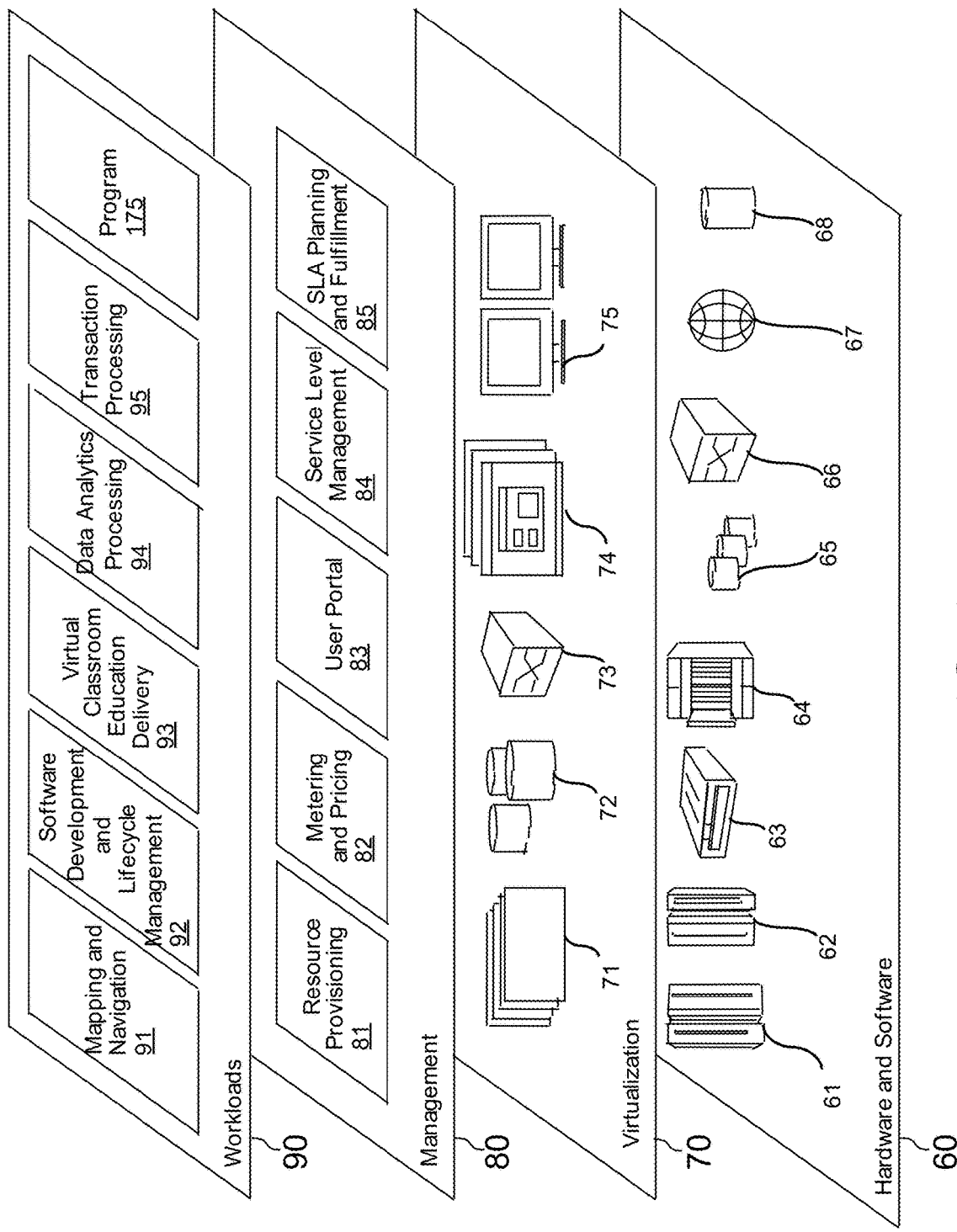
FIG. 6 depicts abstraction model layers, according to an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and FHE security program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method, the method comprising:
    receiving fully homomorphically encrypted (FHE) information from a client device;
    training a machine learning (ML) model using the FHE information, yielding FHE ciphertexts;
    applying a first transform to the FHE ciphertexts, yielding obfuscated FHE ciphertexts wherein the first transform alters a frequency of ciphertext information;
    sending the obfuscated FHE ciphertexts to a secure device;
    receiving a de-crypted and then re-encrypted version of the obfuscated FHE ciphertexts from the secure device;
    applying a second transform to the re-encrypted version of the obfuscated FHE ciphertexts yielding de-obfuscated re-encrypted FHE ciphertexts;
    training the ML model using the de-obfuscated re-encrypted FHE ciphertexts, yielding FHE ML model parameters; and
    sending the FHE ML model parameters to the client device.

2. The computer implemented method according to claim 1, wherein the FHE information comprises data encrypted using a client device private key or a client device public key.

3. The computer implemented method according to claim 1, wherein the re-encrypted obfuscated FHE ciphertexts comprises obfuscated FHE ciphertexts re-encrypted using a client device private key.

4. The computer implemented method according to claim 1, wherein the secure device comprises a hardware security module (HSM).

5. The computer implemented method according to claim 1, wherein applying the first transform obfuscates a frequency aspect of the FHE ciphertexts.

6. The computer implemented method according to claim 1, wherein the first transform is randomly applied to the FHE ciphertexts.

7. The computer implemented method according to claim 1, wherein applying the first transform adds spurious data to the information.

8. A computer program product for securing homomorphic encrypted data, the computer program product comprising one or more computer readable storage devices and collectively stored program instructions on the one or more computer readable storage devices, the stored program instructions comprising:
    program instructions to receive fully homomorphically encrypted (FHE) information from a client device;
    program instructions to train a machine learning (ML) model using the FHE information, yielding FHE ciphertexts;
    program instructions to apply a first transform to the FHE ciphertexts, yielding obfuscated FHE ciphertexts wherein the first transform alters a frequency of ciphertext information;
    program instructions to send the obfuscated FHE ciphertexts to a secure device;
    program instructions to receive a de-crypted then re-encrypted version of the obfuscated FHE ciphertexts from the secure device;
    program instructions to apply a second transform to the re-encrypted version of the obfuscated FHE ciphertexts yielding de-obfuscated re-encrypted FHE ciphertexts;
    program instructions to train the ML model using the de-obfuscated re-encrypted FHE ciphertexts, yielding FHE ML model parameters; and
    program instructions to send the FHE ML model parameters to the client device.

9. The computer program product according to claim 8, wherein the FHE information comprises data encrypted using a client device private key or a client device public key.

10. The computer program product according to claim 8, wherein the re-encrypted obfuscated FHE ciphertexts comprises obfuscated FHE ciphertexts re-encrypted using a client device private key.

11. The computer program product according to claim 8, wherein the secure device comprises a hardware security module (HSM).

12. The computer program product according to claim 8, wherein applying the first transform obfuscates a frequency aspect of the FHE ciphertexts.

13. The computer program product according to claim 8, wherein the first transform is randomly applied to the FHE ciphertexts.

14. The computer program product according to claim 8, wherein applying the first transform adds spurious data to the information.

15. A computer system for securing homomorphic encrypted data, the computer system comprising:
one or more computer processors;
one or more computer readable storage devices; and
stored program instructions on the one or more computer readable storage devices for execution by the one or more computer processors, the stored program instructions comprising:
program instructions to receive fully homomorphically encrypted (FHE) information from a client device;
program instructions to train a machine learning (ML) model using the FHE information, yielding FHE ciphertexts;
program instructions to apply a first transform to the FHE ciphertexts, yielding obfuscated FHE ciphertexts wherein the first transform alters a frequency of ciphertext information;
program instructions to send the obfuscated FHE ciphertexts to a secure device;
program instructions to receive a de-crypted then re-encrypted version of the obfuscated FHE ciphertexts from the secure device;
program instructions to apply a second transform to the re-encrypted version of the obfuscated FHE ciphertexts yielding de-obfuscated re-encrypted FHE ciphertexts;
program instructions to train the ML model using the de-obfuscated re-encrypted FHE ciphertexts, yielding FHE ML model parameters; and
program instructions to send the FHE ML model parameters to the client device.

16. The computer system according to claim 15, wherein the FHE information comprises data encrypted using a client device private key or a client device public key.

17. The computer system according to claim 15, wherein the re-encrypted obfuscated FHE ciphertexts comprises obfuscated FHE ciphertexts re-encrypted using a client device private key.

18. The computer system according to claim 15, wherein the secure device comprises a hardware security module (HSM).

19. The computer system according to claim 15, wherein applying the first transform obfuscates a frequency aspect of the FHE ciphertexts.

20. The computer system according to claim 15, the first transform is randomly applied to the FHE ciphertexts.

* * * * *